Nov. 18, 1952     R. J. WELCHER ET AL     2,618,213
DISK PLOW
Filed Dec. 27, 1948     2 SHEETS—SHEET 1
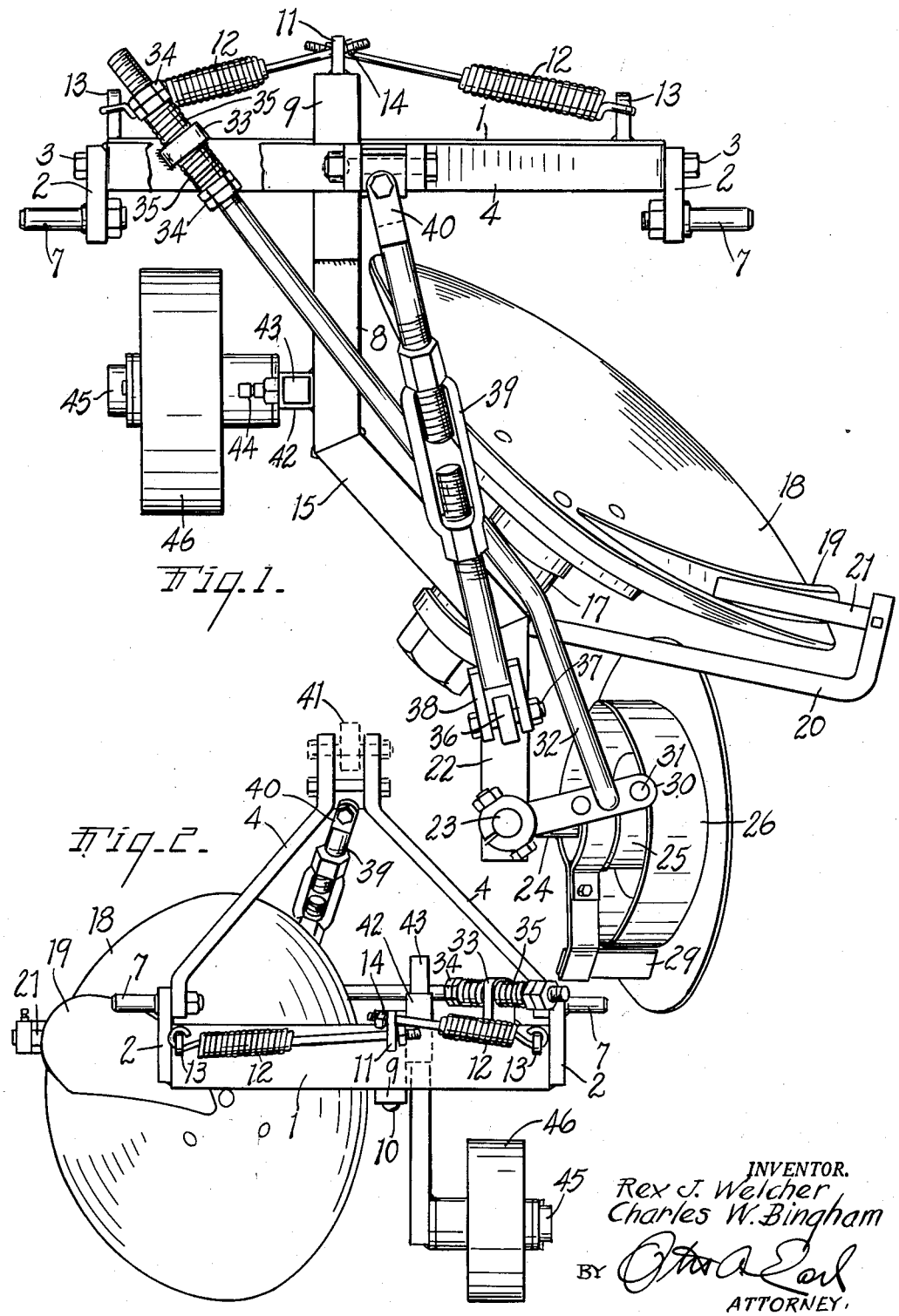
INVENTOR.
Rex J. Welcher
Charles W. Bingham
ATTORNEY Nov. 18, 1952　　　R. J. WELCHER ET AL　　　2,618,213
DISK PLOW
Filed Dec. 27, 1948　　　　　　　　　　　　　2 SHEETS—SHEET 2

INVENTOR.
Rex J. Welcher
Charles W. Bingham
BY
ATTORNEY.

Patented Nov. 18, 1952

2,618,213

UNITED STATES PATENT OFFICE 2,618,213

DISK PLOW

Rex J. Welcher and Charles W. Bingham,
Eau Claire, Mich.

Application December 27, 1948, Serial No. 67,373

5 Claims. (Cl. 97—53)

This invention relates to improvements in disc plows.

The principal objects of this invention are:

First, to provide a disc plow particularly adapted for use with a pulling vehicle having a three point vertically adjustable draft mechanism which plow will follow evenly behind the pulling vehicle with little tendency to swing sideways out of the furrow.

Second, to provide a plow which will automatically swing over obstructions such as stones in the ground and re-align itself behind the pulling vehicle after passing the obstruction.

Third, to provide a yieldable mounting for a disc plow which permits the plow to turn sharp corners behind a pulling vehicle.

Fourth, to provide a disc plow with a spring loaded automatically steerable furrow wheel for keeping the plow properly aligned with the furrow.

Other objects and advantages relating to details of the plow will be apparent from a consideration of the following description and claims.

The drawings, of which there are two sheets, illustrate a preferred form of our plow.

Fig. 1 is a plan view of the plow.

Fig. 2 is a front elevational view of the plow.

Figure 3:
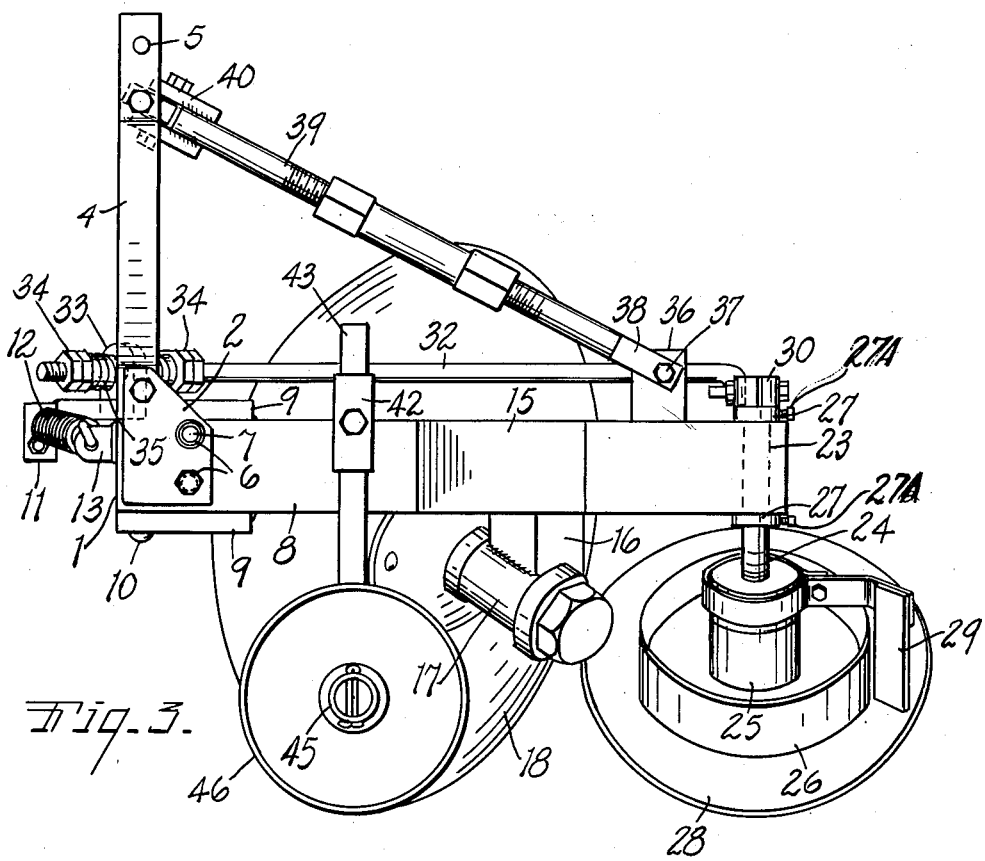
Fig. 3 is a left side elevational view of the plow.

Our plow is designed to be pulled by a tractor or vehicle having two horizontally spaced draft bars and a third draft bar spaced upwardly between the two horizontal bars, all of the draft bars being swingable to raise implements vertically with respect to the vehicle. The draft members of the plow include a horizontal draft bar 1 having end plates 2 secured to each end thereof. The upper ends of the plates 2 are provided with bolts 3 which pivotally attach a yoke 4 to the draft bar. The upper ends of the arms of the yoke converge above the draft bar and are provided with holes 5 for receiving a pin for connecting the upper draft bar of a pulling vehicle to the yoke. The rear edges of the end plates 2 define a pair of vertically spaced holes 6 for selectively receiving side draft pins 7. By selectively positioning the pins 7 the draft car can be connected in a horizontal position to the horizontal draft bars of a pulling vehicle either when the vehicle is operating on level ground or when the vehicle is tilted, as when one wheel is running in a plowed furrow.

Pivotally mounted near the center of the draft bar 1 is the plow bar 8 having upper and lower extension plates 9 which are lapped upon the top and bottom of the draft bar and secured thereto by the pivot pin 10. The upper plate 9 extends forwardly of the draft bar 1 and is provided with an ear 11 through which the inner ends of coil springs 12 extend, as is most clearly illustrated in Figs 1 and 2. The outer ends of the springs 12 are anchored on pins 13 projecting forwardly from the ends of the draft bar 1. The plow bar 8 is thus yieldably held in perpendicular relationship to the draft bar 1 and the springs 12 are preferably placed under an initial tension by adjustment of the nuts 14 on the inner ends of the springs.

The plow bar 8 is provided with an angularly offset portion 15 having a depending bracket 16 secured to the under side thereof. The lower end of the bracket 16 is sloped upwardly toward the right side of the plow and secured, as by welding, to the bearing housing 17. The bearing housing 17 encloses and supports a suitable bearing and shaft for rotatably supporting the deeply dished disc plow 18 in a plane tilted rearwardly from the vertical and laterally from the axis of the plow bar. Preferably a scraper 19 for the forward face of the plow disc is supported from the plow bar by the bracket 20 and adjustable arm 21.

At the rear of the laterally extending portion 15 of the plow bar the plow bar is continued rearwardly, as at 22, and apertured to receive the vertically extending pin 23. The lower end of the pin is bent laterally to the right, as at 24, see Figs. 1 and 3, and forms a support for the hub 25 of a furrow wheel 26. The pin 23 is rotatably secured to the rear portion 22 of the plow bar by the collars 27 secured to the pin by suitable set screws 27A. The furrow wheel 26 is provided with a wide annular flange 28 to penetrate and laterally engage the ground over which the plow is moving. A suitable scraper 29 for the furrow wheel is secured to a stationary portion of the hub 25.

Secured to the upper end of the pin 23 is a laterally extending arm 30 having a series of holes 31 formed therein to selectively receive the downturned rear end of a steering rod 32. The rod 32 extends forwardly and laterally to the left, as shown in Fig. 1, and is passed through an ear 33 secured obliquely to the top of the plow bar 1. The forward end of the steering rod is threaded to receive the nuts 34 on each side of the ear 33 and loading springs 35 are adjustably compressed between the nuts and the ear to yieldably hold the steering rod 32 and arm 30 in a neutral position relative to the draft bar 1 and plow bar 8.

The rear extension 22 of the plow bar is provided with an upstanding ear 36 for receiving the pivot pin 37 which connects the yoke 38 to the plow bar. The yoke 38 is connected to the rear end of a turn buckle strut 39 which extends upwardly and forwardly to between the spaced upper ends of the mounting yoke arms 4. A universal joint coupling 40 connects the forward end of the strut 39 to the mounting yoke and holds the upper ends of the yoke arms in spaced relationship to receive the upper draft bar of the pulling vehicle, as is indicated by the dotted lines at 41 in Fig. 2.

Just forwardly of the laterally offset portion 15 the plow bar 9 is provided with a vertically extending rectangular sleeve 42 which receives the upper end of a bar 43. The bar 43 can be selectively clamped in the sleeve 42 by the set screw 44. The lower end of the bar 43 carries a stub 45 for rotatably supporting a gauge wheel 46.

From the foregoing description it should be apparent that the depth to which the plow disc 18 will penetrate the ground when the plow is lowered behind the pulling vehicle may be readily adjusted and determined by varying the effective length of the turn buckle strut 39 and by adjusting the vertical position of the gauge wheel 46 and its supporting rod 43 on the plow bar. In plowing a straight furrow through an even ground the plow bar 9 will extend normally to the draft bar 1 and the furrow wheel flange 28 will roll in the plowed ground to keep the plow disc and plow bar in proper constant alignment with the draft bar. Should the plow disc strike an object, such as a stone, of sufficient size to throw the disc and plow bar out of alignment with the furrow the springs 12 and 35 will function to re-align the plow disc and plow bar with the direction of travel of the pulling vehicle as soon as the obstruction is passed. The arm 30, steering rod 32 and springs 35, acting upon the furrow wheel 26, function to aid the springs 12 in rapidly returning the plow bar to normal position. For example, when the plow bar is moved to the left, the distance between the pin 23 and the ear 33 is shortened and the rear spring 35 is compressed while the arm 30 is swung rearwardly. This tends to keep the steering wheel flange aligned with the furrow and the direction of travel of the plow. It also opens the forwardly facing angle between the plow bar and the furrow wheel so that the furrow wheel flange digs into the ground on its left side and pulls the plow bar to the right. As the plow bar reassumes its normal position, lengthening of the distance between the pin 23 and ear 33 plus tension in the forward spring 35 closes the arm 30 forwardly toward the plow bar and normal position of the parts.

Should the plow disc and beam be thrown to the right by a stone or root, the action of the steering rod 32, spring 35 and furrow wheel 26 is reversed to quickly realign the plow.

When the pulling vehicle approaches the corner of the field being plowed and turns to the left it is obvious that the draft bar 1 will be twisted to the left because of its rigid connection to the draft bars of the vehicle. However, engagement of the furrow wheel flange with the plowed ground will resist the tendency of the rear end of the plow bar to swing to the right and will cause compression of the rear spring 35 on the steering rod. The turning pressure of the furrow wheel 26 on the pin 23 and rear end of the plow bar will cause the plow bar 8 to twist to the left, as illustrated in Fig. 1, relative to the draft bar 1 thus causing the plow disc 18 to continue in a straight line to the end of the furrow. The action of the furrow wheel and steering rod in holding the plow straight is, of course, limited and as the draft bar swings more to the left with the turning of the tractor, the plow bar and plow will move to the left of the original furrow line. As the furrow wheel reaches the end of the original furrow line pressure of the plowed ground will shift to the out or right hand side of the furrow wheel flange and the stress in the springs 12 and 35 will return the plow bar to perpendicular relationship with the draft bar which is now perpendicular to the new furrow along the second side of the field. It is thus possible to turn sharp corners with the plow and plow closer to the corner post of a field.

While we have illustrated a single disc plow it should be obvious that the same principles of automatic steering and spring loading of the plow bar as well as depth adjustment of the plow bar could be applied to plows having two or more discs mounted in gang relationship. The plow requires practically no attention from the driver of the vehicle after it is once adjusted and the driver can concentrate on keeping the pulling vehicle aligned with the furrow in the ground being plowed.

Having thus described our invention, what we claim as new and desire to secure by Letters Patent is:

1. A plow comprising a transverse draft bar having selectively vertically adjustable draft pins on the ends thereof, a yoke pivotally secured to said draft bar and extending thereabove and adapted to be connected to a center draft bar on a pulling vehicle, a plow bar pivotally mounted on said draft bar and extending rearwardly therefrom, an extension on said plow bar extending forwardly from said draft bar, opposed tension springs connected between said extension and the ends of said draft bar to bias said plow bar in an intermediate normal relationship to said draft bar, an angularly offset portion on said plow bar, a dished plow disc rotatably mounted on said offset portion and tilted at a vertical angle with respect thereto, a rearwardly extending end portion on said plow bar having a pin extending vertically through said end portion, the lower end of said pin being turned laterally at an angle with the vertical, a furrow wheel having a wide annular flange and being rotatably mounted on the laterally turned lower end of said pin, a steering arm secured to the upper end of said pin, a steering rod selectively engageable with said steering arm and extending forwardly across said draft bar, an abutment on said draft bar offset from the pivotal connection between said draft bar and said plow bar and defining an opening through which said steering rod extends, biasing springs positioned around said steering rod on each side of said abutment, nuts on said steering rod for loading said biasing springs, a gauge wheel vertically adjustably mounted on said plow bar, and a strut pivotally connected between a rear portion of said plow bar and a raised portion on said yoke connected to said draft bar, said strut being adjustable in length.

2. A plow comprising a transverse draft bar having draft pins on the ends thereof, a yoke pivotally secured to said draft bar and extending thereabove and adapted to be connected to a center draft bar on a pulling vehicle, a plow bar pivotally mounted on said draft bar and extending rearwardly therefrom, opposed tension springs connected between said plow bar and the ends of said draft bar to bias said plow bar in an intermediate normal relationship to said draft bar, an angularly offset portion on said plow bar, a dished plow disk rotatably mounted on said offset portion and tilted at a vertical angle with respect thereto, a rearwardly extending end portion on said plow bar having a pin extending vertically through said end portion, the lower end of said pin being turned laterally at an angle with the vertical, a furrow wheel having a wide annular flange and being rotatably mounted on the laterally turned lower end of said pin, a steering arm secured to the upper end of said pin, a steering rod selectively engageable with said steering arm, an abutment on said draft bar offset from the pivotal connection between said draft bar and said plow bar and defining an opening through which said steering rod extends, biasing springs positioned around said steering rod on each side of said abutment, nuts on said steering rod for loading said biasing springs, a gauge wheel vertically adjustably mounted on said plow bar, and a strut pivotally connected between a rear portion of said plow bar and a raised portion on said yoke connected to said draft bar, said strut being adjustable in length.

3. A plow comprising a transverse draft bar having draft pins on the ends thereof, a yoke pivotally secured to said draft bar and extending thereabove and adapted to be connected to a center draft bar on a pulling vehicle, a plow bar pivotally mounted on said draft bar and extending forwardly and rearwardly therefrom, opposed tension springs connected between the forwardly extending portion of said plow bar and the ends of said draft bar to bias said plow bar in an intermediate normal relationship to said draft bar, an angularly offset portion on said plow bar, a dished plow disc rotatably mounted on said offset portion and at a vertical angle with respect thereto, a pin extending vertically through the rear of said plow bar, the lower end of said pin being turned laterally at an angle with the vertical, a furrow wheel having a wide annular flange and being rotatably mounted on the laterally turned lower end of said pin, a steering arm secured to the upper end of said pin, a steering rod engaged with said steering arm, an abutment on said draft bar offset from the pivotal connection between said draft bar and said plow bar and defining an opening through which said steering rod extends, biasing springs positioned around said steering rod on each side of said abutment, nuts on said steering rod for loading said biasing springs, and a strut pivotally connected between a rear portion of said plow bar and a raised portion on said yoke, said strut being adjustable in length.

4. A plow comprising a transverse draft bar having draft pins on the ends thereof, a yoke pivotally secured to said draft bar and extending thereabove and adapted to be connected to a center draft bar on a pulling vehicle, a plow bar pivotally mounted on said draft bar and extending forwardly and rearwardly therefrom, opposed tension springs connected between the forwardly extending portion of said plow bar and the ends of said draft bar to bias said plow bar in an intermediate normal relationship to said draft bar, a dished plow disc rotatably mounted on said plow bar and at a vertical and horizontal angle with respect thereto, a pin extending vertically through the rear of said plow bar, the lower end of said pin being turned laterally at an angle with the vertical, a furrow wheel having a wide annular flange and being rotatably mounted on the laterally turned lower end of said pin, a steering arm secured to the upper end of said pin, a steering rod engaged with said steering arm, an abutment on said draft bar offset from the pivotal connection between said draft bar and said plow bar and defining an opening through which said steering rod extends, biasing springs positioned around said steering rod on each side of said abutment, nuts on said steering rod for loading said biasing springs, and a strut pivotally connected between a rear portion of said plow bar and a raised portion on said yoke, said strut being adjustable in length.

5. A plow comprising a transverse draft bar having draft pins on the ends thereof, a yoke pivotally secured to said draft bar and extending thereabove and adapted to be connected to a center draft bar on a pulling vehicle, a plow bar pivotally mounted on said draft bar and extending rearwardly therefrom, opposed springs connected between said plow bar and laterally offset portions of said draft bar to bias said plow bar in an intermediate normal relationship to said draft bar, a dished plow disc rotatably mounted on said plow bar, a pin extending vertically from a rear portion of said plow bar, a furrow wheel having a wide annular flange and being rotatably mounted on an axle extending at an angle from the lower end of said pin, a steering arm secured to the upper end of said pin, a steering rod engaged with said steering arm, an abutment on said draft bar guidingly engaging the forward end of said steering rod and offset from the pivotal connection between said draft bar and said plow bar, other opposed biasing springs positioned between said steering rod and said abutment, nuts on said steering rod for loading said other biasing springs, and a strut pivotally connected between a rear portion of said plow bar and a raised portion on said yoke.

REX J. WELCHER.
CHARLES W. BINGHAM.

REFERENCES CITED

The following references are of record in the file of this patent:

UNITED STATES PATENTS

| Number | Name | Date |
| --- | --- | --- |
| 1,569,266 | Collier | Jan. 12, 1926 |
| 1,577,341 | Mettler | Mar. 16, 1926 |
| 2,230,766 | Smith | Feb. 4, 1941 |
| 2,320,141 | Kott | May 25, 1943 |
| 2,322,342 | Bunn | June 22, 1943 |